(12) United States Patent
Becker et al.

(10) Patent No.: US 9,114,878 B2
(45) Date of Patent: Aug. 25, 2015

(54) WORK AREA IN AN AIRCRAFT

(75) Inventors: Horst Becker, Jork (DE); Hartmut Stein, Hamburg (DE); Anja Wessels, Harsefeld (DE); Mark Detisi, Pembrey (GB); Richard Morris, Pulloxhill (GB)

(73) Assignee: AIRBUS OPERATIONS GMBH, Hamburg (DE)

( * ) Notice: Subject to any disclaimer, the term of this patent is extended or adjusted under 35 U.S.C. 154(b) by 30 days.

(21) Appl. No.: 13/208,289

(22) Filed: Aug. 11, 2011

(65) Prior Publication Data

US 2012/0032026 A1  Feb. 9, 2012

Related U.S. Application Data

(63) Continuation of application No. PCT/EP2010/051580, filed on Feb. 9, 2010.

(60) Provisional application No. 61/151,705, filed on Feb. 11, 2009.

(30) Foreign Application Priority Data

Feb. 11, 2009  (DE) .......................... 10 2009 008 355

(51) Int. Cl.
*B64D 11/04* (2006.01)
*B64D 11/00* (2006.01)
*B64D 11/02* (2006.01)

(52) U.S. Cl.
CPC ............ *B64D 11/04* (2013.01); *B64D 11/0023* (2013.01); *B64D 11/02* (2013.01); *B64D 2011/0046* (2013.01); *Y02T 50/46* (2013.01)

(58) Field of Classification Search
CPC ........ B64D 11/00; B64D 11/04; B64D 11/02; B64D 11/0023; B64D 2011/0046; B64D 50/46
USPC ........ 244/118.5, 118.6, 119, 120, 129.1, 130, 244/137.2
See application file for complete search history.

(56) References Cited

U.S. PATENT DOCUMENTS 4,055,317 A   10/1977  Greiss
5,474,260 A * 12/1995  Schwertfeger et al. .... 244/118.5
6,464,169 B1 * 10/2002  Johnson et al. ............ 244/118.5

(Continued)

FOREIGN PATENT DOCUMENTS

CA      2640123 A1    8/2007
CN    101014496 A     8/2007

(Continued)

OTHER PUBLICATIONS

International Search Report for International Application No. PCT/EP2010/051580 dated Dec. 3, 2010.

(Continued)

*Primary Examiner* — Valentina Xavier
(74) *Attorney, Agent, or Firm* — Ingrassia Fisher & Lorenz, P.C.

(57) ABSTRACT

A work area is provided for members of a flight crew that includes, but is not limited to a central module, which borders an area adapted for being closed intended for use by crew-members to change clothes. The central module is arranged in the tail area of the aircraft cabin, and can be used for stowing trolleys. The area is closed by lateral doors, and can be used as a passageway when the doors are open.

15 Claims, 7 Drawing Sheets

(56) References Cited

U.S. PATENT DOCUMENTS

| | | | |
|---|---|---|---|
| 6,823,927 B2 * | 11/2004 | Steel et al. | 160/210 |
| 7,275,716 B2 * | 10/2007 | Saint-Jalmes | 244/118.6 |
| 7,562,844 B2 * | 7/2009 | Boren | 244/118.5 |
| 7,905,451 B2 | 3/2011 | Schotte et al. | |
| 8,335,353 B2 | 12/2012 | Yamamoto et al. | |
| 2006/0054741 A1 | 3/2006 | Mills et al. | |
| 2006/0060704 A1 | 3/2006 | Lavie et al. | |
| 2006/0202085 A1 | 9/2006 | Schotte et al. | |
| 2007/0018046 A1 | 1/2007 | Boren | |
| 2007/0108346 A1 | 5/2007 | Zwaan | |
| 2007/0125909 A1 * | 6/2007 | Seiersen et al. | 244/118.5 |
| 2008/0011901 A1 | 1/2008 | Guering | |
| 2009/0050738 A1 * | 2/2009 | Breuer et al. | 244/118.5 |
| 2009/0261200 A1 | 10/2009 | Saint-Jalmes et al. | |
| 2009/0314889 A1 | 12/2009 | Baatz et al. | |
| 2010/0140400 A1 | 6/2010 | Helfrich et al. | |
| 2010/0181425 A1 | 7/2010 | Guering et al. | |

FOREIGN PATENT DOCUMENTS

| | | |
|---|---|---|
| DE | 102007012376 A1 | 9/2008 |
| FR | 2929244 A1 | 10/2009 |
| WO | 00/46100 A2 | 8/2000 |
| WO | 2007096000 A1 | 8/2007 |
| WO | 2009004217 A1 | 1/2009 |

OTHER PUBLICATIONS

German Office Action for German Application No. 102009008355.3 dated Feb. 8, 2010.

U.S Appl. No. 61/151,705, filed Feb. 11, 2009.

Japan Patent Office, Japan Office Action dated Feb. 26, 2013 for Japan Patent Application No. 2011-549539.

China Patent & Trademark Office, Office Action in Chinese Patent Application No. 201080007538.5, mailed Jun. 5, 2013.

Japan Patent Office, Notice of Allowance for Japanese Application No. 2011-549539 dated Oct. 22, 2013.

The German Patent and Trade Mark Office, Office Action for German Patent Application No. 10 2009 008 355.3, mailed Dec. 2, 2013.

* cited by examiner

WORK AREA IN AN AIRCRAFT

CROSS-REFERENCE TO RELATED APPLICATION

This application is a continuation of International Application No. PCT/EP2010/051580, filed Feb. 9, 2010, which was published under PCT Article 21(2) and which claims priority to German Patent Application no. 10 2009 008 355.3 filed Feb. 11, 2009 and of U.S. Provisional Patent Application no. 61/151,705 filed Feb. 11, 2009, the disclosures of which are hereby incorporated herein by reference.

TECHNICAL FIELD

The technical field relates to the outfitting of aircraft cabins. In particular, the technical field relates to a work area for members of the flight crew as well as to an aircraft with a passenger cabin and such a work area.

BACKGROUND

Contemporary passenger aircraft incorporate interior facilities with specific functional features (so-called monuments), which can accommodate handcarts (trolleys), for example, and offer stowage space for equipment items, such as kitchen utensils. WO 2007/096000 A1 and CA 2 640 123 depict such monuments, for example of the kind used in onboard kitchens. US 2007/0018046 A1 depicts a service area in the tail of an aircraft, which is U-shaped, and can accommodate several trolleys.

It may be desirable to provide for a work area for members of a flight crew, which can be used in particular in a wide-bodied aircraft, saving on space therein while at the same time increasing the number of potential uses. In addition, desirable features and characteristics will become apparent from the subsequent summary and detailed description, and the appended claims, taken in conjunction with the accompanying drawings and this background.

SUMMARY

One exemplary embodiment of the invention discloses a work area for members of a flight crew that exhibits a central module, a floor area and an area adapted for being closed. The floor area is where the members of the flight crew stay. The area adapted for being closed is used for one or more crewmembers to change clothes. The central module is designed for accommodation on the floor area in a tail section of an aircraft cabin. The area adapted for being closed is adjacent to the central module.

Therefore, the central module is used to border the sealable area on one side. To this end, the central module exhibits a wall element, for example, which extends over the entire height of the cabin. Since the central module may help form the sealable area, no changing cabin is required. This may make it possible to save on space and weight. Among other things, the work area may be used as an onboard kitchen (galley).

In another exemplary embodiment of the invention, the work area further exhibits a first monument, a second monument and a third monument, wherein the three monuments are adjacent to three exterior sides of the floor area, the exterior sides being sides facing outward borders of the floor area. In other words, the three monuments "frame" the floor area.

In another exemplary embodiment of the invention, the sealable area, i.e., the area adapted for being closed comprises a separating wall as a partition relative to a passenger area, kitchen area or toilet area of the aircraft. Therefore, the sealable area is bordered by the central module on the one side, and then by the separating wall, for example on the opposite side. The separating wall may be a standalone separating wall or a portion of a climbing module (stairwell or stairhouse module), a toilet module or onboard kitchen module.

In another exemplary embodiment of the invention, the work area comprises a stairhouse module, wherein the area adapted for being closed is arranged between the stairhouse module and the central module. The stairhouse module may allow the members of the flight crew to get from the passenger deck to a recreation and sleeping module for the cabin personnel (cabin crew rest compartment, CCRC). An onboard toilet module or a kitchen module can also be provided in place of the climbing module.

In addition or as an alternative, the area adapted for being closed can exhibit two doors in another exemplary embodiment of the invention. The one door can be secured to the central module, for example, while the other (second) door can be attached to the separating wall or the climbing or onboard toilet module.

The second door may perform a dual function. On the one hand, it may be used to close off the sealable area toward the passenger cabin. On the other hand (in the "open" state), it may be used to close off the climbing area. For example, this is depicted on FIG. 1. This may eliminate the need for an additional door for the climbing module. The doors can be swinging doors or sliding doors. Curtains may also be provided. One possible advantage to swinging doors or sliding doors may be that these doors can also perform mechanical support functions, imparting additional stability to the central module and climbing or onboard toilet module when the doors lock off the sealable area.

In another exemplary embodiment of the invention, the area adapted for being closed is designed as a passageway between two cabin areas of the passenger cabin, wherein the work surface or floor area also is designed as a passageway between the two cabin areas. If the two doors are open, the passengers may hence select the area adapted for being closed as the passageway. This may make it possible to avoid an unnecessarily high number of people residing in the monuments, thereby causing delays in ongoing work. This may also increase the safety of onboard operations.

In another exemplary embodiment of the invention, the first monument is designed for arrangement on the port side of the aircraft, the second monument for arrangement on the starboard side, and the third monument for arrangement on the tail side of the aircraft.

In another exemplary embodiment of the invention, the corresponding exterior sides of the three monuments are adjusted to the contour of the aircraft hull. This may make it possible to facilitate both installation and attachment of the monuments.

In another exemplary embodiment of the invention, the first monument is connected with the third monument, and the second monument with the third monument, each at a respective corner, so that the floor area exhibits an angular outline. In particular, the corners are not rounded. This may save on additional space.

In another exemplary embodiment of the invention, the three monuments and the central module are designed to accommodate trolleys.

In another exemplary embodiment of the invention, the work area also comprises a seat for a crewmember, which is secured to a front side of the first or second monument. Such a seat can be secured to each of the two monuments.

In another exemplary embodiment of the invention, the work area further comprises an assistance area, which is situated between the seat for the crewmember and an exterior side of the aircraft.

In another exemplary embodiment of the invention, the work area further comprises a first stowage module and a second stowage module. The first stowage module abuts the first monument and the third monument, while the second stowage module abuts the second monument and the third monument.

These two stowage modules may not be used for accommodating trolleys, but rather for accommodating system connections or additional equipment items. The space between the monuments may hence not be used for trolleys. Important equipment items, e.g., additional swim vests, can also be stored there. Stowage compartments for kitchen utensils can be provided in the upper area.

In another exemplary embodiment of the invention, the central module comprises a trapezoidal outer contour. For example, this may enable a situation where the trolleys are guided into the central module when being pushed in, and where an initially slanted introduction is possible. Trolleys may also be guided on the outside of the central module. In this way, typical work sequences in the onboard kitchen may be simplified.

Another exemplary embodiment of the invention relates to an aircraft with a passenger cabin and a work area described above and below.

A still other exemplary embodiment of the invention relates to the use of a work area described above and below in an aircraft.

BRIEF DESCRIPTION OF THE DRAWINGS

The embodiments of the present invention will hereinafter be described in conjunction with the following drawing figures, wherein the depictions on the figures are diagrammatic and not to scale and the same reference numbers are used for identical or similar elements, and.

DETAILED DESCRIPTION

The following detailed description of the invention is merely exemplary in nature and is not intended to limit application and uses. Furthermore, there is no intention to be bound by any theory presented in the preceding background or summary or the following detailed description.

Figure 1:
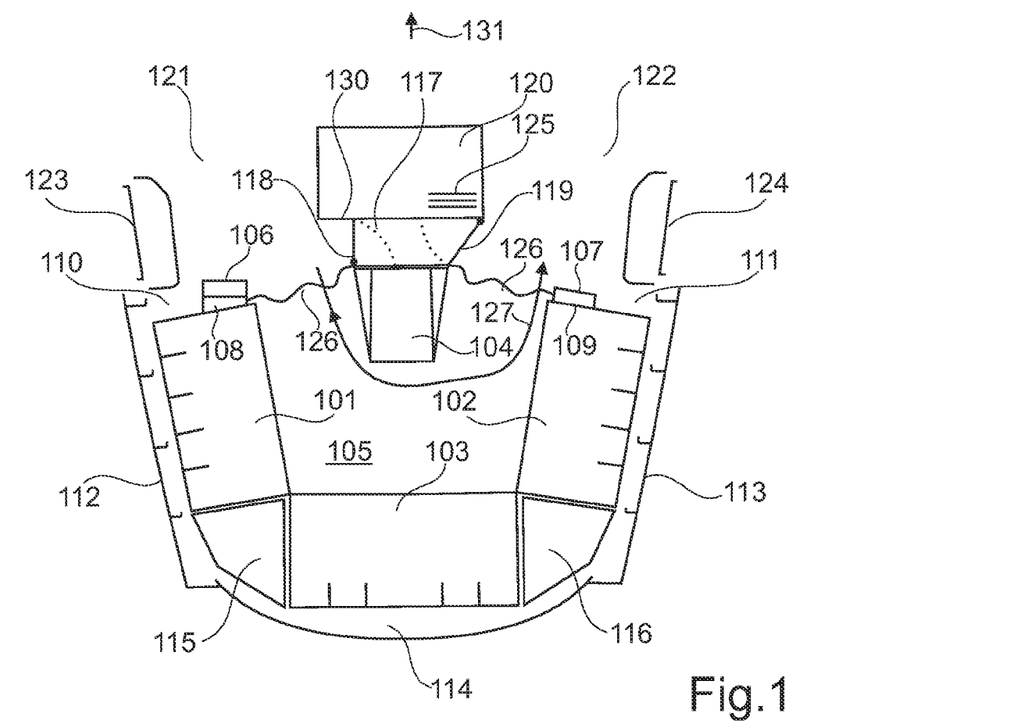
FIG. 1 shows a view of the work area according to an exemplary embodiment of the invention.

FIG. 1 shows a work area for members of a flight crew according to an exemplary embodiment of the invention. The work area is situated in the aft area of the aircraft, and exhibits three monuments, of which the first monument 101 is arranged at the port wall 112 of the aircraft, the second monument 102 at the starboard wall 113 of the aircraft, and the third monument 103 at the tail wall 114 of the aircraft.

The three monuments each abuts at a respective corner and can be connected at the respective corner. The three monuments 101 to 103 each exhibit a rectangular cross section, and can accommodate several trolleys. In the embodiment shown on FIG. 1, the lateral monuments 101, 102 can accommodate five trolleys, and the transversely mounted tail monument 103 can accommodate six trolleys. Also provided are two stowage modules 115, 116, which are also adjusted on their tail sides to the contour of the aircraft hull, and arranged between the first and third or second and third monument. Also provided is a central module 104, which is abutted by an area 117 adapted for being closed. For example, the area 117 adapted for being closed is used to enable a crewmember to change clothes therein. It can also serve as a vestibule for a stairhouse module (stairwell) 120, which allows access to a CCRC (cabin crew rest compartment).

The three monuments 101, 102, 103 define a floor area 105 on which the crewmembers can reside, and which can additionally be used to get from a left passenger cabin area 121 to a right passenger cabin area 122 (and vice versa) (see arrow 127). The area 117 adapted for being closed is adjacent to the climbing module 120 with stairs 125. Therefore, the sealable area 117 is formed by a rear wall 130 of the climbing module 120 on the one hand, and a front wall of the central module 104 on the other. Also provided are two doors 118, 119. The first door 118 is secured to the central module 104 like a swinging door, and the second door 119 is secured to the other, right side of the sealable area on the climbing module 120. Both doors 118, 119 can be opened toward the inside (meaning into the sealable area 117). When the door 119 is opened, the stairs 125 are closed off. Curtains 126 can be provided for separating the floor area 105 from the passenger cabin. Reference numbers 123 and 124 denote a left or right rear door of the aircraft.

Secured to faces 108, 109 of the monuments 101, 102 are seats 106, 107 for the flight personnel. The seats are arranged either parallel to the corresponding face (seat 107) or perpendicular to the longitudinal axis of the aircraft (seat 106). A respective assistance area 110, 111 that can be used by the crewmembers is situated between the respective seats 106, 107 and the exterior wall of the aircraft.

Arranging the various modules according to an embodiment off the invention may make it possible to provide the flight passengers a comparatively large amount of space. In addition, this arrangement may increase flexibility, ergonomics and comfort for the flight participants (passengers and personnel), as well as productivity with respect to the tasks to be performed by the flight personnel. In sum, the work area may enable the accommodation of 18 full-size trolleys, or if desired 15 full-size trolleys and eight half-size trolleys. For example, 36 half-size trolleys may also be stowed away.

Figure 5A:
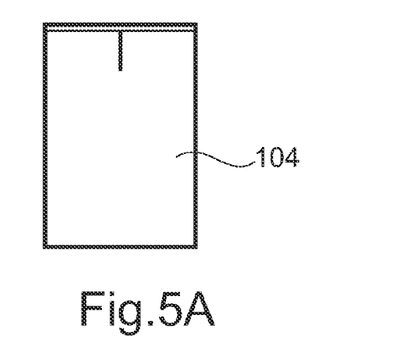
FIG. 5A to 5C show three exemplary embodiments of a central module according to the exemplary embodiments of the invention.
Figure 5B:
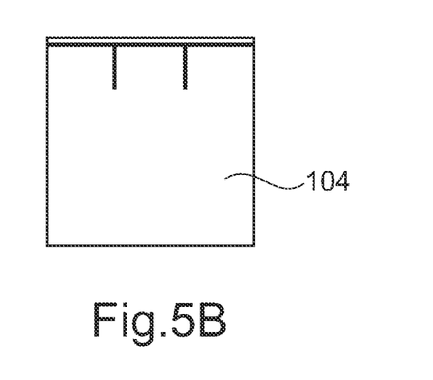

The three monuments 101, 102, 103 (galleys) are adjusted to the profile of the aircraft hull and arranged on the exterior walls. The central module 104 can exhibit various floor spaces. These are shown on FIG. 5A to 5C. The angle between the adjacent monuments 101, 103 or 103, 102 measures more than approximately 90 degrees, since the outer monuments 101, 102 are arranged parallel to the outer wall, and the third monument 103 is arranged transverse to the aircraft longitudinal axis 131. The areas for accommodating the trolleys are cooled in one exemplary embodiment.

Figure 2:
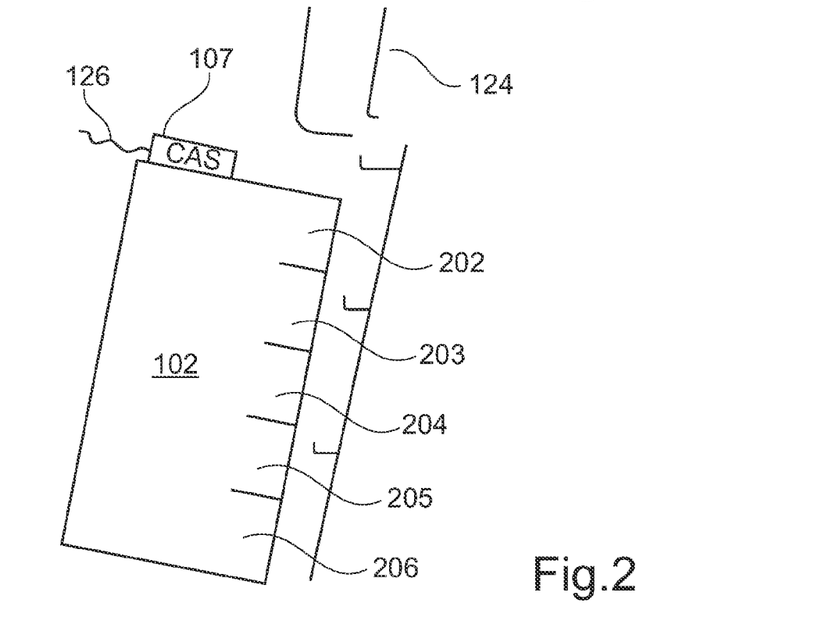
FIG. 2 shows a detailed view of a section of the work area on FIG. 1.

FIG. 2 shows an enlarged view of the right area of the work area on FIG. 1, in which the starboard monument 102 is arranged. As evident from FIG. 2, this monument exhibits five areas 202 to 206 for accommodating five full-size trolleys. In another embodiment, the monument 102 can accommodate ten half-size trolleys, while in another embodiment, it can accommodate three full-size trolleys and four half-size trolleys.

Figure 3:
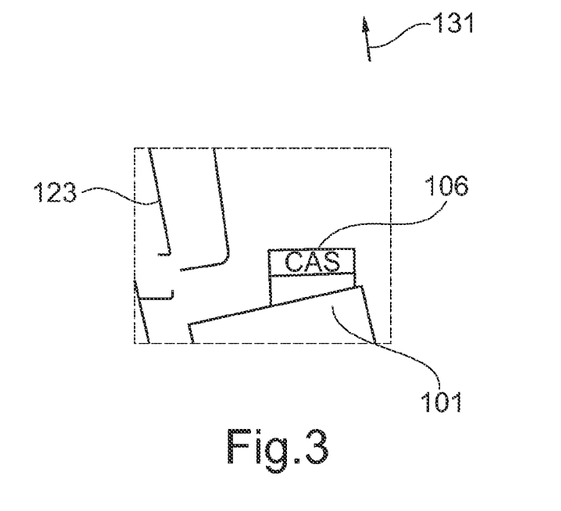
FIG. 3 shows another detailed view of a section of the work area on FIG. 1.

FIG. 3 shows a section of the left area of the work area on FIG. 1, which depicts the left outside door 123 along with the cabin personnel seat 106, which is situated in such a way that the user looks in the flight direction 131.

Figure 4:
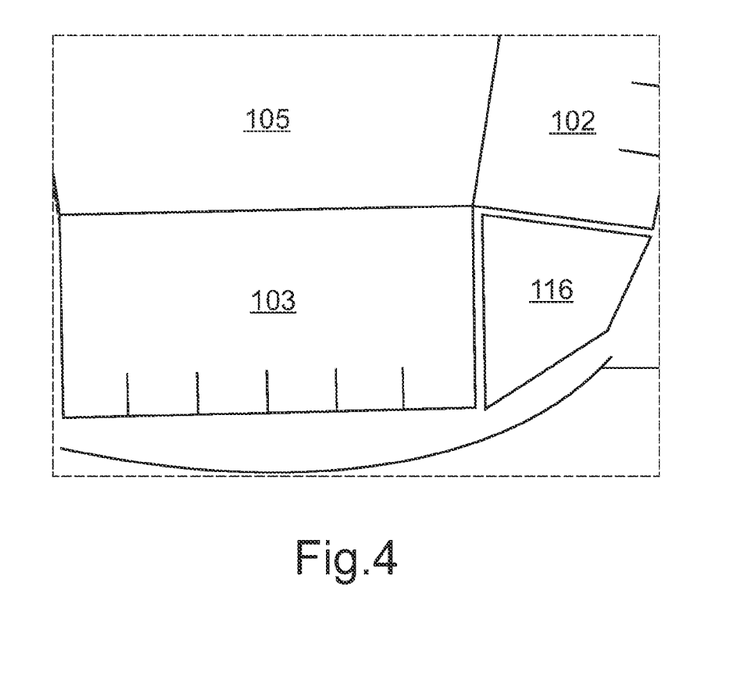
FIG. 4 shows another detailed view of a section of the work area on FIG. 1.

FIG. 4 shows another section of the work area on FIG. 1, which depicts the arrangement of the rear monument 103 and starboard monument 102, along with the starboard stowage module 116. The stowage module 116 is arranged between the two monuments 103 and 102, and can be used for system connections and/or also for accommodating waste containers and wastewater tanks, for example.

The variable central module 104 can exhibit various designs. For example, these designs depend on which airports the airline flies to, and which tasks are to be performed by the onboard personnel. For example, the central module 104 can be non-cooled or cooled. In the exemplary embodiment of FIG. 5A, the central module 104 exhibits a rectangular cross section for storing two full-size trolleys. In the exemplary embodiment of FIG. 5B, the central module 104 has space for three full-size trolleys, and is also rectangular in design.

Figure 5C:
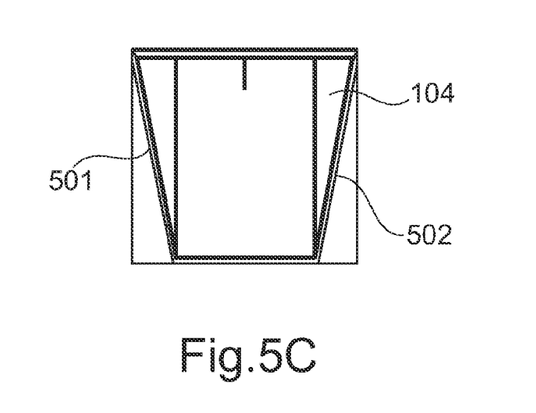

In the exemplary embodiment on FIG. 5C, the central module 104 is trapezoidal. In this way, it becomes possible to guide the trolleys through the outer walls 501, 502 accordingly during service as they move toward the port or starboard aisle of the passenger cabin. This may make it possible to simplify operation of the trolleys.

Figure 6A:
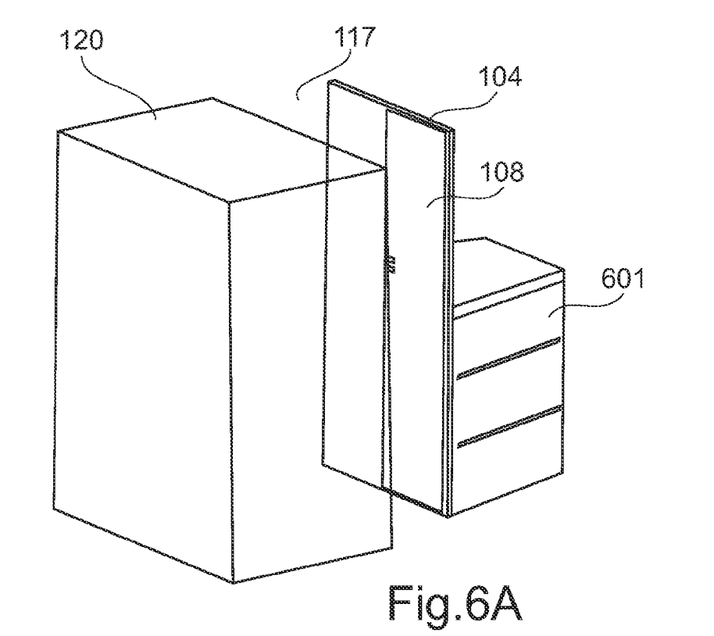
FIG. 6A to 6J show additional central modules according to additional exemplary embodiments of the invention.

FIG. 6A to 6J show various exemplary embodiments of the central module 104. The central module 104 can take up the full height (like the door 108) or only half the height (equal to the trolley height). Also possible is a combination of full height and half height, as depicted in the figures. FIG. 6A depicts such a central module 104, in which the area 601 in which the trolleys can be stored exhibits half the height. As a result, the crewmembers can move around comparatively freely at elbow height. In addition to stowing trolleys, the central module can also be designed for storing other equipment items, articles of clothing, such as coats, in the form of a newspaper stand or with shelves, or as a self-service area. Situated in front of the central module 104 is the sealable area 117, which is bordered by the separating wall with the door 108 of the central module on the one hand, and by the climbing module 120 on the other.

Figure 6B:
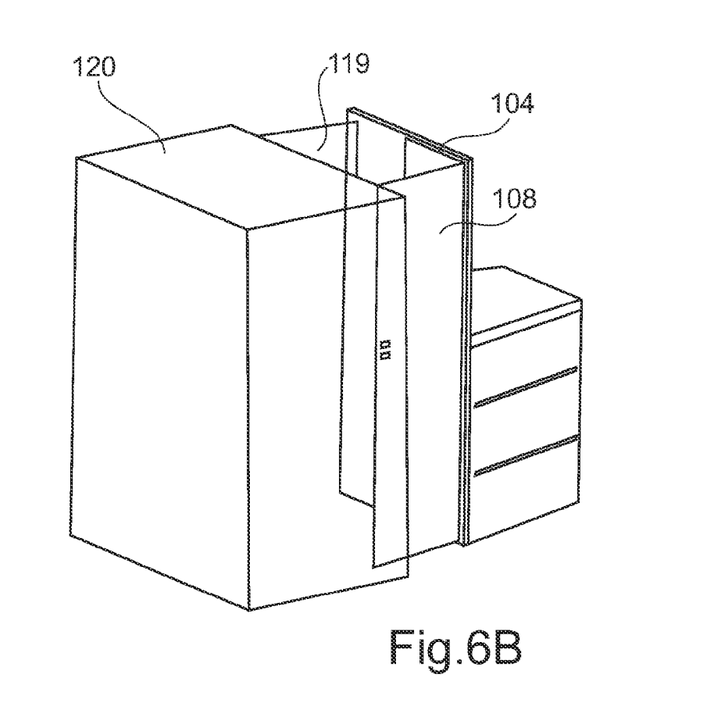

As evident from FIG. 6B, the climbing module 120 also exhibits a door 119, which can be used to close off the area 117. FIG. 6B depicts the configuration in which both doors 108, 119 close off the sealable area 117, so that the crewmember can change clothes in the area 117.

Figure 6C:
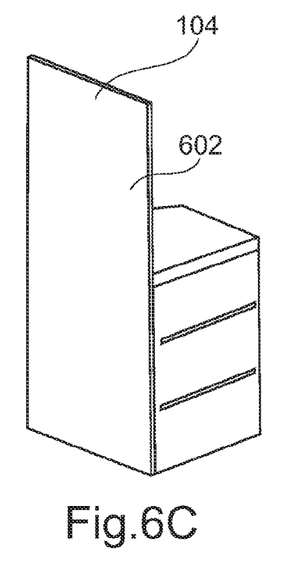
Figure 6D:
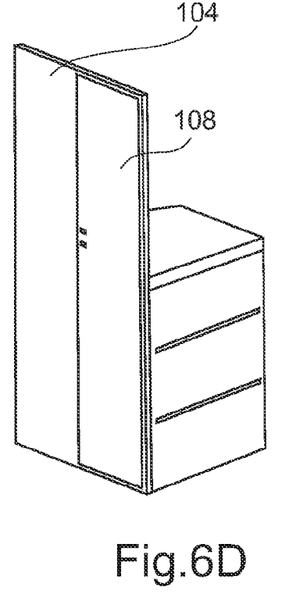
Figure 6E:
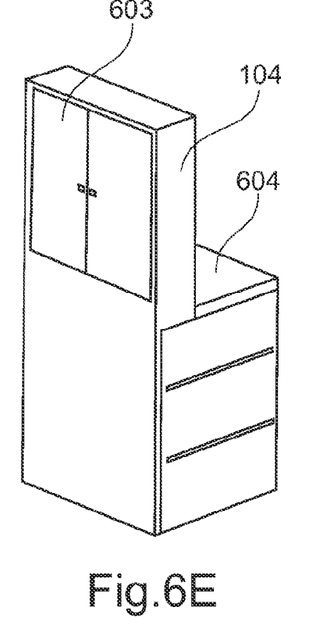
Figure 6F:
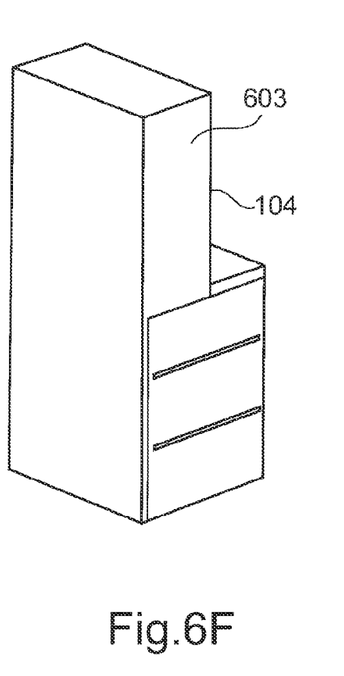
Figure 6G:
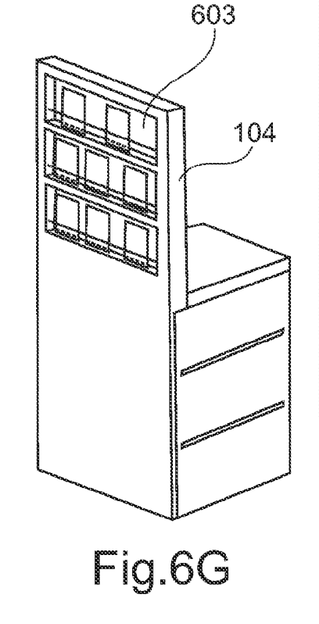
Figure 6H:
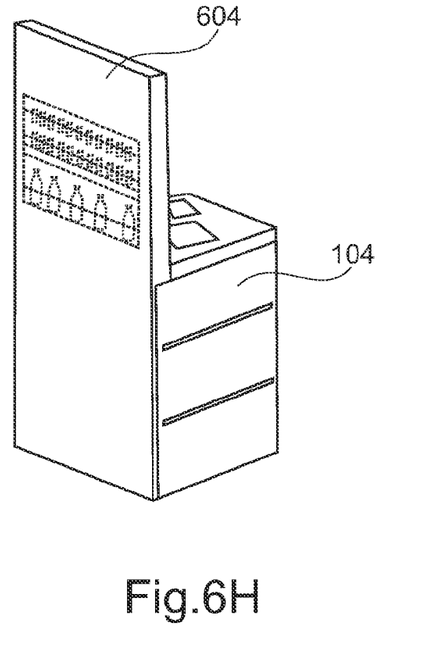
Figure 6I:
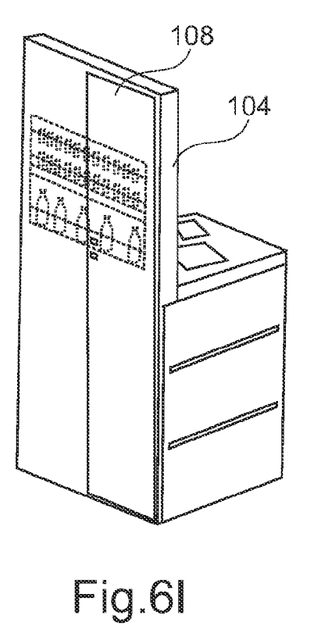
Figure 6J:
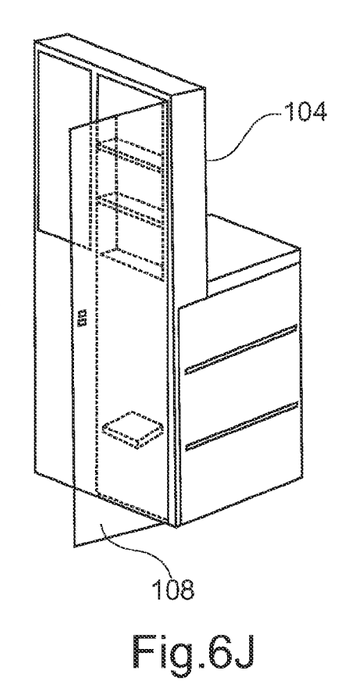

FIG. 6C shows a central module 104 with a separating wall 602 without a door. The separating wall exhibits the full cabin height. The separating wall can also exhibit a lower height, e.g., half the height. FIG. 6D shows a central module 104 with a door 108 secured to the separating wall. FIG. 6E shows the embodiment of a central module 104 with another stowage compartment 603 above the work area 604. The stowage compartment 603 can be operated from the changing area 117. The stowage area 603 can also face in the opposite direction, so that it can be operated from the kitchen area. FIG. 6F shows a central module 104 with a stowage compartment 603, which takes up half the depth of the central module. FIG. 6G shows a central module 104 with a separating wall 603 in the form of a magazine rack. FIG. 6H shows a central module 104 with a separating wall 604 in the form of a self-service area for passengers, at which passengers can get beverages, etc. FIG. 6I shows a central module 104 with a door 108, also designed as a self-service area. FIG. 6J shows a central module 104, also with a door and designed as a cabinet with stowage areas for the onboard personnel.

When using the cabin crew rest compartment, which is accessible by a stair module, the area 117 can be sealed off from the rest of the passenger cabin by the two doors of the separating wall or the central module and the climbing module so that the crewmembers can change clothes. In this case, the passengers can use the floor area 105 if they wish to get from one cabin aisle to the other. If the two doors are opened, the area 117 can also be used by passengers, whether to pass through on the one hand, or for purposes of self-service and relaxation on the other.

Figure 7:
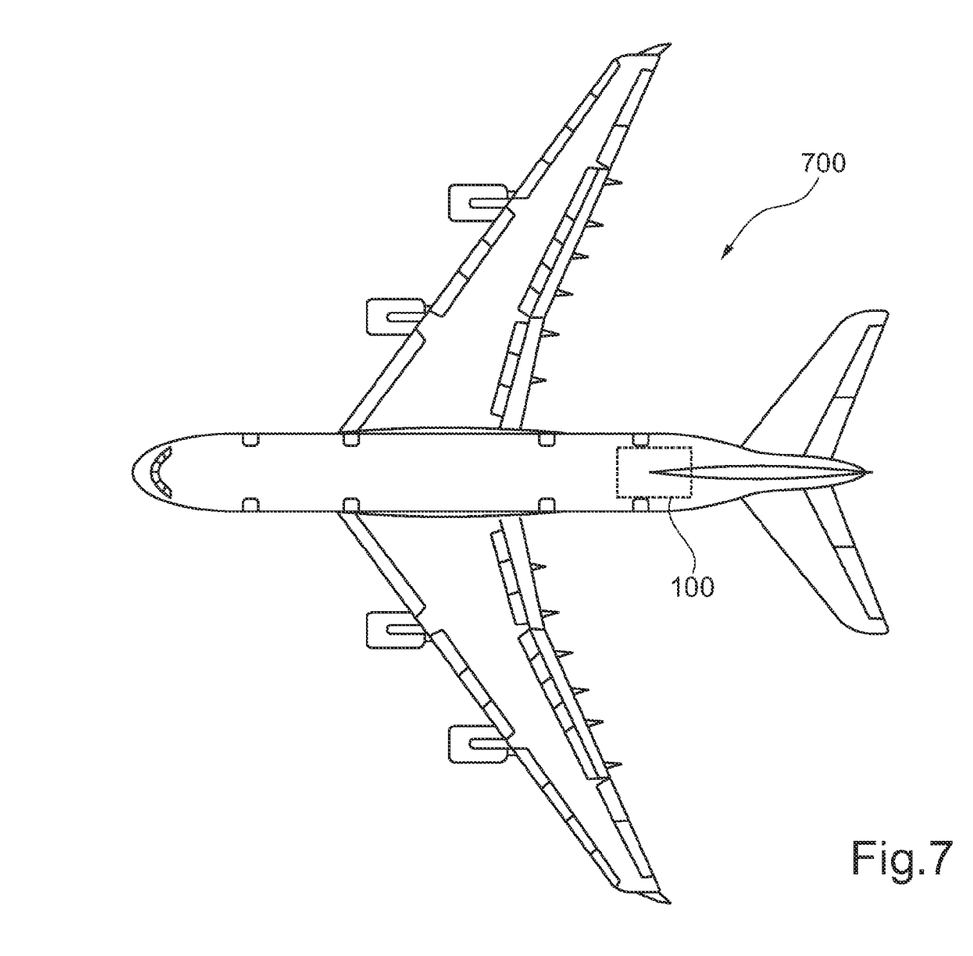
FIG. 7 shows an aircraft according to an exemplary embodiment of the invention.

FIG. 7 shows an aircraft 700 with a work area 100 according to an exemplary embodiment of the invention. The work area 100 is arranged in the rear area of the passenger cabin of the aircraft. The work area 100 can also be built into other aircraft, for example zeppelins or helicopters.

Let it be noted in addition that "comprising" and "exhibiting" do not preclude any other elements or steps, and "an" or "one" do not rule out a plurality. Let it further be noted that features or steps that were described with reference to one of the above exemplary embodiments can also be used in combination with other features or steps of other exemplary embodiments described above. Reference numbers in the claims are not to be construed as limitations. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A work area for members of a flight crew, comprising:
   a cabin of the aircraft having a first cabin area and a second cabin area;
   a floor area configured for the members of the flight crew;
   an upright central module configured in a rear area of the cabin on the floor area;
   a stair house module arranged in front of the central module;
   an area formed by the central module on a first side and the stair house module on the second side, and adapted to close to serve as a changing area for at least one of the members of the flight crew,
   wherein the area includes a first passageway between the first cabin area and the second cabin area of the cabin and includes a first door arranged at a first end of the first passageway and a second door arranged at a second end of the first passageway, each of the first door and the second door for blocking the first passageway, and
   wherein the floor area is a second passageway between the first cabin area and second cabin area.

2. The work area of claim 1, further comprising:
   a first monument;
   a second monument; and
   a third monument;

wherein the first monument, the second monument, and the third monument border three exterior sides of the floor area.

3. The work area according to claim 2,
wherein the first monument is arranged on a port region of the aircraft,
wherein the second monument is arranged on a starboard region of the aircraft, and
wherein the third monument is arrange on a tail region of the aircraft.

4. The work area of claim 2, wherein exterior sides of the first monument, the second monument, and the third monument are adjusted to a contour of the aircraft hull.

5. The work area of claim 2,
wherein the first monument is connected with the third monument, the second monument is connected with the third monument, each at a respective corner, so that the floor area exhibits an substantially angular outline.

6. The work area of claim 2,
wherein the first monument, the second monument, the third monument and the central module accommodate trolleys.

7. The work area of claim 2, further comprising a seat for at least one of the members of the flight crew that is secured to a front side of the first monument.

8. The work area of claim 7, further comprising an assistance area that is arranged between the seat for the at least one of the members of the flight crew and an exterior side of the aircraft.

9. The work area of claim 2, further comprising:
a first stowage module; and
a second stowage module,
wherein the first stowage module borders the first monument and the third monument, and
wherein the second stowage module boarders the second monument and the third monument.

10. The work area of claim 1, wherein the central module comprises a trapezoidal outer contour.

11. The work area of claim 1, wherein the central module comprises a rectangular outer contour.

12. An aircraft, comprising:
a passenger cabin having a first cabin area and a second cabin area; and
a work area for members of a flight crew, comprising:
a floor area configured for the members of the flight crew;
a first monument adjacent a rear wall of the cabin;
an upright central module configured in a rear area of the cabin on the floor area in front of the first monument;
a stair house module arranged in front of the central module;
an area formed by the central module on a first side and the stair house module on a second side, and adapted to close to serve as a changing area for at least one of the members of the flight crew,
wherein the area includes a first passageway between the first cabin area of the passenger cabin and the second cabin area of the passenger cabin, and includes a first door arranged at a first end of the first passageway and a second door arranged at a second end of the first passageway, each of the first door and second door configured to block the first passageway, and
wherein the floor area is a second passageway between the first cabin area and the second cabin area.

13. A work area for members of a flight crew, comprising:
a cabin of the aircraft having a first cabin area and a second cabin area;
a floor area configured for the members of the flight crew;
a first monument adjacent a rear wall of the cabin;
an upright central module configured in a rear area of the cabin on the floor area in front of the first monument;
a toilet module arranged in front of the central module;
an area formed by the central module on a first side and the toilet module on a second side, and adapted to close to serve as a changing area for at least one of the members of the flight crew,
wherein the area includes a first passageway between the first cabin area of the cabin and the second cabin area of the cabin, and includes a first door arranged at a first end of the first passageway and a second door arranged at a second end of the first passageway, each of the first door and second door configured to block the first passageway, and
wherein the floor area is a second passageway between the first cabin area and the second cabin area.

14. A work area for members of a flight crew, comprising:
a cabin of the aircraft having a first cabin area and a second cabin area;
a floor area configured for the members of the flight crew;
a first monument adjacent a rear wall of the cabin;
an upright central module configured in a rear area of the cabin on the floor area in front of the first monument;
a kitchen module arranged in front of the central module;
an area formed by the central module on a first side and the kitchen module on a second side, and adapted to close to serve as a changing area for at least one of the members of the flight crew,
wherein the area includes a first passageway between the first cabin area of the passenger cabin and the second cabin area of the passenger cabin, and includes a first door arranged at a first end of the first passageway and a second door arranged at a second end of the first passageway, each of the first door and second door configured to block the first passageway, and
wherein the floor area is a second passageway between the first cabin area and the second cabin area.

15. The work area of claim 1 further comprising a first monument adjacent a rear wall of the cabin, wherein the upright central module is located in front of the first monument.

* * * * *